United States Patent
Chen et al.

[11] Patent Number: 5,516,818
[45] Date of Patent: May 14, 1996

[54] METHOD FOR REMOVING SMALL AMOUNTS OF HIGH BOILING POINT ORGANIC COMPOUND FROM AQUEOUS POLYMERIZATION PRODUCTS

[75] Inventors: Sun-Lin Chen, Akron; Tang H. Wong, Hudson; Ramesh N. Gujarathi, Munroe Falls, all of Ohio

[73] Assignee: The Goodyear Tire & Rubber Company, Akron, Ohio

[21] Appl. No.: 311,974

[22] Filed: Sep. 26, 1994

[51] Int. Cl.$^6$ .................. C08F 6/10; C08J 3/03
[52] U.S. Cl. ............ 523/332; 523/328; 523/330; 523/340; 528/490; 528/491; 528/493; 528/496; 528/498; 528/499; 528/500; 528/502; 528/934
[58] Field of Search .................. 523/340, 328, 523/330, 332; 528/500, 490, 502, 491, 493, 496, 498, 499, 934

[56] References Cited

U.S. PATENT DOCUMENTS

| | | | |
|---|---|---|---|
| 3,583,967 | 6/1971 | Hattori et al. | 528/500 |
| 3,879,327 | 4/1975 | Burke, Jr. | 523/360 |
| 3,968,067 | 7/1976 | Burke, Jr. | 260/29.6 |
| 4,017,355 | 4/1977 | Kiyota et al. | 159/49 |
| 4,031,056 | 6/1977 | Patel et al. | 523/329 |
| 4,070,325 | 1/1978 | Burke, Jr. | 260/29.7 |
| 4,115,316 | 9/1978 | Burke, Jr. | 528/500 |
| 4,130,527 | 12/1978 | Miller et al. | 528/500 |
| 4,504,654 | 3/1985 | Duffy | 528/500 |
| 5,084,134 | 1/1992 | Mattiussi et al. | 523/340 |

FOREIGN PATENT DOCUMENTS 2091128   9/1993   Canada.

Primary Examiner—Paul R. Michl
Assistant Examiner—Olga Asinovsky
Attorney, Agent, or Firm—Bruce J. Hendricks

[57] ABSTRACT

A process for achieving a significant reduction in the volatile organic compound content (VOC) of an aqueous polymerization system includes the steps of contacting the aqueous polymerization system with an organic solvent and allowing said organic solvent to be absorbed into polymer particles of said aqueous polymerization system, contacting said aqueous polymerization system and organic solvent with a gas or vapor at temperature and pressure conditions which cause mass transfer of the volatile organic compounds from said latex into said gas or vapor phase, and separating said gas or vapor from said aqueous polymerization system. The solvent is generally absorbed into the polymer particles of the latex and serves as a stripping aid, especially with respect to higher molecular weight compounds which tend to remain trapped in the polymer particles during conventional stripping processes. An important advantage of the invention is that it facilitates significantly enhanced VOC reduction using conventional stripping apparatus with only relatively minor modifications thereto. The improved stripping performance of the invention is achieved without any significant deleterious effect on colloidal stability, average polymer particle size, solids content or other important latex properties.

12 Claims, 1 Drawing Sheet

METHOD FOR REMOVING SMALL AMOUNTS OF HIGH BOILING POINT ORGANIC COMPOUND FROM AQUEOUS POLYMERIZATION PRODUCTS

FIELD OF INVENTION

The present invention relates to a method for separating volatile organic compounds (VOC) such as unreacted monomers, dimers, low molecular weight oligomers, and by-products from aqueous polymerization systems such as latexes and to the resulting purified systems which contain very low levels of VOC therein. More specifically, the invention pertains to an improved stripping process wherein relatively high boiling point VOC which have a tendency to be trapped in the polymer particles of latices and other aqueous dispersed or suspended polymer systems are more effectively removed to provide latices having significantly reduced levels of VOC.

BACKGROUND OF THE INVENTION

The ultimate conversion of monomers in an aqueous polymerization system such as suspension, emulsion or dispersion is often very high: usually in excess of 90 or 95, and often more than 99 percent. However, due to environmental emission and safety standards, it is generally necessary to remove and recover residual, unreacted monomers from the resulting aqueous polymerization system such as a latex composition as well as small amounts of dimers, trimers, oligomers, and non-polymer by-products. While the quantity of dimers and other oligomers is generally very low relative to the amount of residual monomers present in most latices, these oligomers are frequently more objectionable and difficult to remove than the residual monomers. Specifically, larger molecules such as oligomers formed during a variety of suspension, emulsion or dispersion polymerization processes are often odorous and diffuse through the polymer particles of the latices at much slower rates than the residual monomers, and tend to remain trapped within the polymer particles during conventional monomer recovery processes such as evacuation, steam stripping, nitrogen stripping, etc.

While solvent extraction can be used for decreasing the amount of VOCs having relatively high boiling point temperatures to an acceptable level, it requires large quantities of solvent which must be subsequently purified for reuse such as by flash distillation. Moreover, the cost of the extraction and solvent purification equipment, and the energy consumption of the associated processes generally eliminates solvent extraction as a viable method for removing VOCs from latices. Another disadvantage is that significant amounts of solvent remain in the latex and can adversely affect the stability of the latex, cause coagulation or foaming, and require further treatment to remove the solvent.

SUMMARY OF THE INVENTION

The invention provides an improved stripping process for significantly reducing the total VOCs in aqueous polymerization systems without substantially adversely affecting the stability or other important characteristics thereof. The process is particularly useful for removing significant amounts of higher molecular weight, higher boiling point temperature VOCs which cannot be readily removed by using conventional stripping processes.

The process of the invention involves contacting an aqueous polymerization system such as a latex with a small amount of an organic solvent and subjecting the latex to stripping using steam or an inert gas such as nitrogen. The solvent can be either introduced in the stripping apparatus with the stripping gas or vapor, or can be mixed with the latex prior to introducing the latex into the stripping apparatus. The organic solvent acts as a stripping aid which provides an unexpected and significant improvement in the stripping efficiency.

DESCRIPTION OF THE PREFERRED EMBODIMENTS

Figure 2:
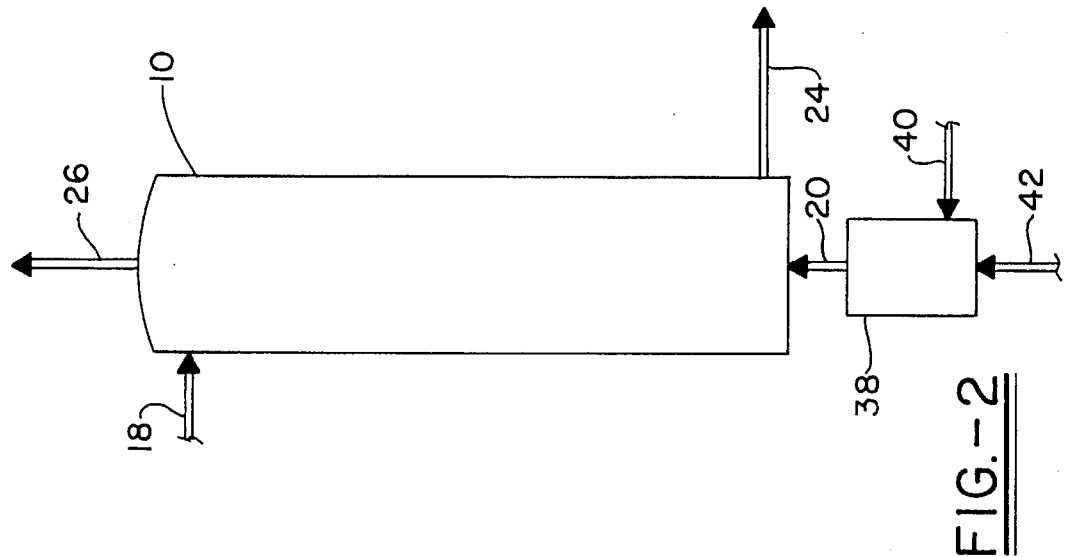
FIG. 2 is a schematic representation of an alternative apparatus for practicing the method of the invention.

The method of the invention can be performed using generally any conventional apparatus suitable for contacting an aqueous polymerization system such as a dispersion emulsion or suspension, with a suitable quantity of a gas or vapor necessary to strip the volatile organic components from the system, e.g., a latex. The method can be carried out in a batch or semi-batch mode by bubbling or sparging the gas or vapor through a vessel containing the latex, or, more preferably, in a continuous mode using conventional stripping apparatus such as a wetted wall tower, a tower filled with solid packing material, an empty tower into which latex is sprayed and through which the gas flows, a tower containing one or more bubble-cap, sieve or valve-type plates, etc. Continuous stripping is generally carried out in a counter current mode wherein the gas flows upwardly and the liquid stream flows downwardly, although co-current flows are also possible in the practice of the invention.

The method of the invention can be carried out at any suitable pressure for achieving the desired mass transfer of VOCs from the aqueous polymerization system to the gas or vapor phase, but is desirably conducted at subatmospheric pressures, such as below 14 psia (720 torr), desirably from about 2 psia (about 100 torr) to about 14 psia (about 720 torr), and preferably from about 5 psia (about 260 torr) to about 10 psia (about 520 torr). The method of the invention is generally carried out at an elevated temperature which is sufficiently high to maximize volatilization and mass transfer of the VOCs from the latex and into the gas or vapor, but not so high as to cause thermal degradation of the polymer particles of the latex. Suitable stripping temperatures (i.e. temperatures to which the latex is exposed during the stripping process) depend on the particular latex systems, types and amounts of VOCs which are to be removed, and on the pressures at which the process is carried out, but are generally in the range from about 10° C. to about 99° C., more desirably in the range from about 40° C. to about 90° C., and most preferably in the range from about 70° C. to about 90° C.

The amounts or flow rates of the latex and the gas or vapor are determined using conventional chemical engineering design techniques, taking into consideration the equilibrium relations for the particular latex-gas or latex-vapor system, the liquid and vapor capacity of the equipment which will be used, and the desired level of VOC removal.

The process will be described in greater detail with reference to FIG. 1 which is a schematic representation of a preferred apparatus for practicing the invention. The apparatus includes a stripping tower 10 which can be of any suitable design (preferably a packed or plate-type tower). In accordance with a preferred technique for practicing the method of the invention, the latex from which VOCs are to be removed is premixed with an organic solvent prior to being introduced into the stripping tower 10. The latex and organic solvent flow into the mixing vessel 12 through separate feed lines 14 and 16, respectively. Mixing vessel 12 preferably includes means for agitating the latex and organic solvent, and is desirably of a suitable volume to provide an average residence time which is sufficient to ensure complete mixing of the latex with the organic solvent. Most preferably, the mixture of latex and organic solvent entering the striping tower 10 through transfer line 18 has undergone sufficient agitation and contact with each other, e.g., average residence times of as much as 5, 10 or even 15 minutes to allow enough of the organic solvent to be absorbed into the polymer particles of the latex to cause appreciable swelling thereof. In some cases it is possible to achieve satisfactory results without mixing vessel 12 by merely injecting the organic solvent directly into the latex feed line 14 immediately upstream of the stripping tower 10.

In accordance with the preferred embodiment, the mixture of latex and organic solvent is fed through transfer line 18 into the stripping tower 10, preferably near the top of the stripping tower, and onto a liquid distributor which causes the downward flow of the mixture of latex and organic solvent to be relatively, uniformly distributed over the cross sectional area of the stripping tower in the event that the stripping tower is a packed or plate-type tower. In the case of a wetted wall tower the distributor would be designed to cause the liquid mixture to flow downward along the inner wall of the tower such that a liquid film of relatively uniform thickness is provided. If a spray type tower is used, the liquid mixture is preferably distributed in the form of a relatively fine mist using any of an assortment of known spray nozzles, such as a whirl-chamber hollow cone nozzle, a solid cone nozzle, an oval-orifice fan nozzle, a deflector jet nozzle, an impinging jet nozzle, etc.

A stripping gas or vapor is fed through line 20 into a bottom region of the stripping tower 10, and preferably into a conventional gas distributor 22. The stripping gas and liquid mixture desirably flow counter current to each other with mass transfer of VOCs from the liquid mixture to the stripping gas occurring at the interfacial areas created within stripping tower 10. The liquid thus flows through stripping tower 10 with the VOCs and the organic solvent being removed therefrom 10 and the stripped latex exits the stripping tower through line 24. The VOC ladened gas or vapor exits the stripping tower through line 26 and is preferably subsequently treated to separate the VOCs, organic solvent and stripping gas from one another using any of various conventional techniques such as gas adsorption, absorption, condensation, distillation, etc. The organic solvent and stripping gas are preferably purified and recycled back into the stripping tower 10. The VOCs can be incinerated or otherwise properly disposed of or utilized.

The desired stripping temperatures are preferably maintained by preheating the stripping gas or vapor such as at heat exchanger 28 so that the gas or vapor enters the stripping tower 10 at the maximum desired operating temperature. In some cases it may also be necessary or desirable to preheat the latex or the mixture of latex and organic solvent such as at heat exchanger 30, or to supply heat to the stripping tower 10 such as through heating coils 32 or heating jacket 34, or a combination thereof in order to maintain the desired minimum stripping temperature throughout the stripping tower. The stripping operation is generally performed at subatmospheric pressures by exhausting the stripping gas or vapor through a vacuum pump or exhaust blower 36.

Figure 1:
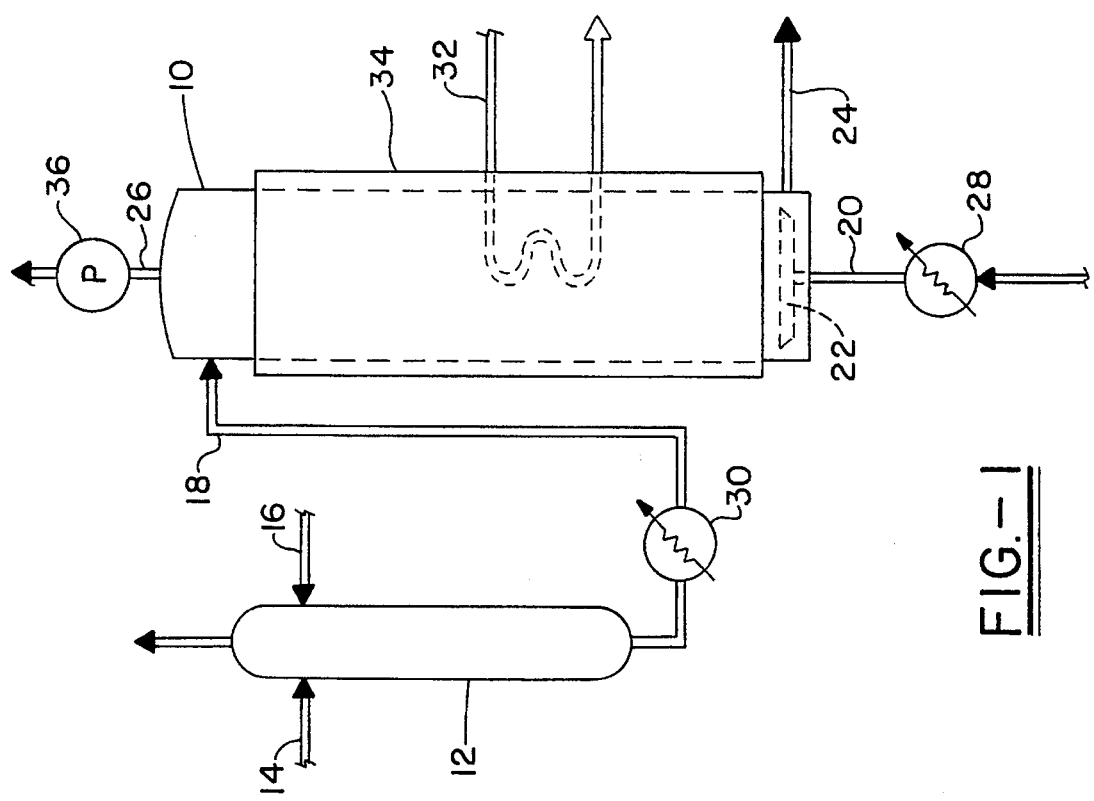
FIG. 1 is a schematic representation of an apparatus for practicing the method of the invention.

A modified apparatus for practicing an alternative technique of the method of the invention is shown in FIG. 2, wherein components similar to those of FIG. 1 are identically numbered and the description thereof is hereby incorporated by reference. The apparatus of FIG. 2 is generally similar to the apparatus of FIG. 1, except that the organic solvent is carried by the stripping gas or vapor 20. The modified apparatus can also include various heating means such as those set forth in FIG. 1. The organic solvent and the stripping gas or vapor are fed to a dispersing device 38 via lines 40 and 42, respectively. The dispersing device 38 can be internal or external (as shown) of the stripping tower. This alternative technique of premixing the organic solvent with the stripping gas or vapor is generally less desirable than that of premixing the organic solvent with the latex, but can provide acceptable results in certain cases.

Suitable stripping gases or vapors include steam and any of various gases which are inert with respect to the latex such as air, nitrogen, helium, argon, carbon dioxide, etc.

The method of the invention can generally be used for enhancing VOC removal from a variety of aqueous polymerization systems, especially for enhancing removal of high molecular weight, high boiling point VOCs which either cannot be removed, or which are difficult to remove, using conventional stripping techniques. Enhanced VOC removal can especially be achieved with the emulsion copolymerization product of one or more vinyl substituted aromatics having from about 8 to about 12 carbon atoms (e.g., styrene) and one or more conjugated dienes having from about 4 to about 8 carbon atoms (e.g., butadiene, isoprene) and preferably carboxylated latexes thereof made using one or more carboxylic acids having from 2 to 8 carbon atoms, (e.g., itaconic acid). A preferred latex is thus itaconic acid-styrenebutadiene latex.

Generally, any rubber type latex can be treated according to the present invention, including latexes polymerized from one or more conjugated dienes having from 4 to 10 carbon atoms, for example, polybutadiene, polyisoprene, and the like; nitrile rubber latexes; butyl rubber latexes such as those made from isobutylene and small amounts of a conjugated diene such as isoprene; polychloroprene latexes; and isobutylene-methyl ether copolymer latices.

The present invention is also suitable with respect to the emulsion polymerization or copolymerization product of one or more acrylates or methacrylates wherein the ester portion has from about 1 to about 10 carbon atoms (e.g. polymethyl methacrylate latex), the polymerization product of various ethylenically unsaturated monomers (e.g. vinyl substituted aromatic compounds such as d-methyl styrene and polystyrene, halogenated vinyl substituted aromatic compounds, polyvinyl chloride, esters of acrylamide and polyvinyl acetate), and the like. The method is also applicable to various suspension and dispersion polymerization systems.

The present invention is particularly useful in treating styrene-butadiene and carboxylated-styrenebutadiene rubber latexes, especially those having a high butadiene content. Inherent within the production of such latexes are various impurities such as butadiene monomer, styrene monomer, ethyl benzene (an impurity commonly found in styrene feed streams), 4-phenyl cyclohexene (a co-dimer of butadiene and styrene hereinafter designated as 4-PCH), and 4-vinyl cyclohexane (a butadiene product of a Dieis-Alder type reaction hereinafter designated as 4-VCH). While conventional stripping (such as steam stripping) methods and apparatuses generally remove high amounts of residual styrene and butadiene monomers along with 4-VCH and ethyl benzene, very little of the 4-PCH is removed to due to its high boiling point. In the immediately above-noted system, the present invention has been found to notably reduce the total amount of VOCs remaining to generally less than 100 parts by weight per million parts by weight (ppm) of the aqueous polymer system, desirably less than 50 ppm, and preferably less than 30 ppm, and even less than 20 ppm. Generally, the amount of VOCs after treatment according to the present invention is very low, for example, the amount of styrene and butadiene are each generally below 5 ppm and often below 1 ppm, the amount of a ethyl benzene and vinyl cyclohexane is often below 5 ppm and often less than 1 ppm, the amount of 4-PCH is below 100 ppm and often below 50 ppm, and the amount of 4-VCH is generally below 5 ppm and often below 1 ppm. In contrast thereto, the VOC level remaining after utilization of conventional steam stripping techniques is generally in the vicinity of about 300 ppm.

With regard to other aqueous polymer systems such as suspension, emulsion, or dispersions which contain polymers therein, the amount of VOC remaining after using the method of the present invention is generally comparable to that of the above-noted carboxylated-styrene-butadiene rubber latexes, i.e. less than 100, desirably less than 50, and preferably less than 30 or 20 parts by weight per million parts by weight of the polymer system.

Suitable organic solvents which can be used as stripping aids in the practice of the invention generally include any of various well known hydrocarbon, oxygenated hydrocarbon, halogenated hydrocarbon, or oxygenated hydrocarbon solvents which can be introduced into the stripping apparatus as a liquid, but which can completely volatilize at the temperatures and pressures which are maintained within the stripping apparatus. Suitable organic solvents are generally those which have a normal boiling point temperature between about 50° C. and about 120° C., and preferably between 80° C. and 100° C. Water immiscible solvents are generally preferred.

Specific examples of suitable organic solvents which can be used in the practice of the invention include: aliphatic compounds, especially linear, branched or cyclic alkanes, containing from 5 to about 8 or 9 carbon atoms; aromatic or alkyl substituted aromatic compounds containing from 6 up to about 8 or 9 carbon atoms; monoalcohols containing from 1 to about 4 carbon atoms; and less desirable ketones containing from 3 to about 5 carbon atoms; ethers containing from 3 to about 5 carbon atoms; etc. Particularly preferred organic solvents include non-polar, water immiscible, aliphatic solvents such as n-heptane, n-hexane, 2-methyl hexane, cyclohexane, cycloheptane, and the like; aromatic compounds such as benzene, toluene, m-,o-, or p-xylene, and the like. Any of the above-described organic solvents or stripping aids can be used alone or in various combinations.

The organic stripping aids are generally utilized in relatively small amounts in relation to the aqueous polymer system. An appreciable improvement in stripping performance can be observed even when very small amounts of organic stripping aid, such as less than 0.5, 1 or 2 parts by weight per 100 parts by weight of latex, are used. However, very satisfactory results are achieved when an organic stripping aid or a combination of two or more organic stripping aids are used in a total amount in the range from about 0.5 to 50, and more desirably in the range from about 0.75 to 30, and preferably from about 1 to about 5 parts by weight per 100 parts by weight of aqueous polymer system.

The process of the invention has important advantages over other methods (such as liquid-liquid extraction) which have been proposed to achieve lower VOC levels in latex compositions. One major advantage is that the invention provides a means for achieving large reductions in VOC levels (such as over 50 percent, 75 percent or even higher reductions in VOC as compared to conventional stripping methods) using existing stripping equipment while requiring only relatively minor modification thereto. Moreover, the improved stripping performance of the invention is achieved without any substantial harmful effect on the latex. In particular, colloidal stability, average particle size, solids content, pH, and other important latex properties are substantially unaffected by the process of the invention.

The invention can be more fully understood by reference to the following illustrative examples.

EXAMPLE

The efficiency of the method of the present invention is demonstrated in the following examples wherein a carboxylated styrene-butadiene latex having a solid polymer content of about 52 percent by weight was mixed with various organic solvent stripping aids in accordance with the principles of the invention and subsequently distilled.

Samples A-J and Control A were prepared by mixing 100 grams of a carboxylated styrene-butadiene latex having a sold polymer content of about 52 percent with the amounts of organic solvent (stripping aid) and water listed in Table 1. The latex, water and solvent for each of the samples were mixed in a beaker with a magnetic stir bar for about 10 to 15 minutes and then transferred to a rotary evaporator. The bath temperature of the apparatus was set at 90° C. and a vacuum of about 350 millibars was applied to the rotary evaporation in each case. In each case the amount of water listed in Table 1 was distilled off, condensed and collected in a graduated cylinder and the remaining latex was analyzed to determine the amounts of 4-VCH, styrene, and 4-PCH remaining. The amounts of residual 4-VCH, styrene and 4-PCH remaining after distillation are listed in Table 1.

For purpose of comparison, a control which did not contain any organic solvent (stripping aid) was also prepared and distilled in accordance with the above procedure. The amounts of 4-VCH, styrene and 4-PCH which were present in the carboxylated styrene-butadiene latex (before distillation) used for each of the Samples A–J and the Control are also shown in Table 1.

Sample K was prepared and distilled in a manner generally similar to that of Samples A–J, except that 10 ml of pentane (stripping aid) were mixed with 100 ml of the latex and 50 ml of water, and 10 ml of water was distilled, then an additional 10 ml of pentane was added and another 10 ml of water was distilled.

Samples L1 and L2 are duplicate runs which were prepared and distilled in a manner generally similar to that of Samples A–J, except that, rather than mixing the hexane with the latex and water prior to distillation, the hexane (stripping aid) was added dropwise to the premixed latex and water in the rotary evaporator over approximately a 30 minute period during the distillation, and 200 ml of latex (rather than 100 ml) were used.

Samples M1 and M2 are duplicate runs which were prepared and distilled in a manner generally similar to that of Samples A–J, except that the hexane (stripping aid) was added in four separate stages in equal amounts. The initial mixture contained 200 ml of latex (rather than 100 ml), 5 ml of hexane and 20 ml of water. After 20 ml of water were distilled from the rotary evaporator, an additional 5 ml of hexane and 20 ml of water were added, and another 20 ml of water were distilled from the rotary evaporation. The foregoing step-wise addition of water and hexane followed by distillation of water was repeated two more times, so that the total amount of water added was 80 ml, the total amount of hexane added was 20 ml, and the total amount of distillate was 80 ml.

TABLE 2

| Sample | Distillation Pressure | 4-VCH | Styrene | 4-PCH | Ethyl Benzene | Xylene |
|---|---|---|---|---|---|---|
| N1 | ~350 mbar (vacuum) | ND | ND | 36 ppm | — | — |
| N2 | ~350 mbar (vacuum) | ND | ND | 43 ppm | — | — |
| N3 | from ~ 450 initially down to ~ 300–350 mbar | ND | ND | 16 ppm | <1 ppm | ND |

ND - not detected (significantly below 1 ppm)

TABLE 1

| Sample | Stripping Oil | Water added | Water Distilled | 4-VCH | Styrene | 4-PCH |
|---|---|---|---|---|---|---|
| Latex before distillation | N/A | NA | NA | 10 ppm | 237 ppm | 126 ppm |
| Control A | None | 50 ml | 50 ml | 3 | 58 | 104 |
| A | 10 g hexane | 10 ml | 20 ml | 2 | 4 | 93 |
| B | 20 ml methyl-ethyl ketone | 20 ml | 40 ml | 2 | 51 | 108 |
| C | 20 ml hexane | 20 ml | 40 ml | 2 | 52 | 111 |
| D | 5 ml toluene | 20 ml | 40 ml | 4 | 20 | 112 |
| E | 10 ml pentane | 10 ml | 10 ml | 2 | 55 | 113 |
| F | 5 ml heptane | 50 ml | 25 ml | 2 | 60 | 108 |
| G | 5 ml heptane | 50 ml | 50 ml | 1 | 21 | 94 |
| H | 3 ml pentane | 50 ml | 50 ml | <1 | 22 | 97 |
| I | 6 ml pentane | 50 ml | 50 ml | <1 | 18 | 95 |
| J | 5 ml hexane | 50 ml | 50 ml | ND | 11 | 98 |
| K | 20 ml pentane[1] | 50 ml | 20 ml | ND | 17 | 98 |
| L1 | 20 ml hexane[2] | 100 ml | 100 ml | 3 | 4 | 45 |
| L2 | 20 ml hexane[2] | 100 ml | 100 ml | 3 | 4 | 45 |
| M1 | 20 ml hexane[3] | 80 ml | 80 ml | 4 | 3 | 43 |
| M2 | 20 ml hexane[1] | 80 ml | 80 ml | 3 | 2 | 45 | ppm - part by weight per million parts by weight of the residual latex after being partially distilled at about 90° C. and about 350 mbar vacuum.
[1]stripping aid was added in two stages.
[2]stripping aid was added incrementally and 200 ml of latex were used.
[3]stripping aid was added in for stages and 200 ml of latex were used.

The results listed in Table 1 clearly demonstrate that the use of an organic solvent as a stripping aid in accordance with the principles of the invention leads to lower levels of total VOC than are possible with conventional stripping or distillation. The results also generally indicate that better results are achieved when the stripping aid is a non-polar, water immiscible organic compound, and that aliphatic compounds, especially hexane and heptane, appear to provide for better stripping of VOCs from latexes than aromatic compounds.

Samples N1, N2 and N3 were each prepared by mixing 1,000 g of the carboxylated styrene-butadiene latex containing about 52 percent by weight solid polymer with 50 0 ml of water and 200 ml heptane. Sample N1 was distilled at a starting vacuum pressure of about 350 mbar. Samples N2 and N3 were distilled at starting vacuum pressure of about 450 mbar which was gradually dropped, at a relatively uniform rate, to a vacuum pressure of about 300–350 mbar during the distillation. For samples N1, N2 and N3, 500 ml of water were distilled from a rotary evaporator. The amount of 4-VCH, styrene and 4-PCH remaining in the latex after distillation are listed in Table 2. For Sample N3 the amount of ethyl benzene and xylene which was present in the latex after distillation was also determined and listed in Table 2. The initial amounts of 4-VCH, styrene and 4-PCH were the same as with Samples A-M2.

The results shown in Table 2 when compared with the results of Sample G of Table 1 suggest that the efficiency of the process is not adversely affected when scaled-up, and that lower VOC levels can be achieved when more water is distilled from the latex.

Another set of Samples (Control B, P1 and P2) were prepared by mixing 1,500 grams of another carboxylated styrene-butadiene latex, also having a solid content of about 52 percent by weight, with 750 grams of water. No organic solvent (stripping aid) was added to Control B. For Sample P1, 150 grams of hexane were added, and for sample P2, 150 grams of heptane were added. The samples were mixed with a magnetic stir bar for about 10 to 15 or minutes and then transferred to a suitable rotary evaporator. The bath for the rotary evaporation was set at 90° C. and the contents of the evaporation were subjected to about a 350 mbar vacuum. The distilled vapors were condensed and collected in a graduated glass cylinder. Distillation was stopped after 750 ml of condensate were collected. The latex remaining in the evaporation was analyzed to determine the amount of styrene, ethyl benzene, 4-VCH and 4-PCH present. Physical properties of the treated (stripped) latexes were also evaluated to verify that the process does not have an appreciable effect on the latex properties. The results (listed in Table 3) show that the stripping aids of the invention enhance VOC removal without significantly affecting solids content, particle size, pH, and surface tension.

TABLE 3

| Sample | Control B (2X soap) | P1 (Hexane Stripped) | P2 (Heptane Stripped) |
| --- | --- | --- | --- |
| Solids Content | 52 | 51.1 | 50.3 |
| Particle Size | 188.9 | 196 | 197.6 |
| pH | 8.9 | 8.8 | 10 |
| Surface Tension | 52 | 41.8 | 48 |
| Styrene (ppm wet) | 49 | Non-detectable | Non-detectable |
| EB | 4 | Non-detectable | Non-detectable |
| 4-VCH | 12 | Non-detectable | Non-detectable |
| 4-PCH | 42 | 25 | 21 |

The method of the invention was also tested by steam stripping a latex in a 10 foot packed column having a 3 inch inside diameter. The packing material was Pall Flexiring. A latex was premixed with heptane (5 weight percent of the wet latex). Before entering the column, the latex/heptane mixture was passed through a heater to raise the temperature to 165° F. The pressure at the top of the column was maintained at 7 psia. The latex flow rate was set at 40 grams per minute the steam rate was set at 13 grams per minute. The amount of 4-PCH in the latex was reduced from 65 ppm to 20 ppm.

While in accordance with the Patent Statutes, the best mode and preferred embodiment has been set forth, the scope of the invention is not limited thereto, but rather by the scope of the attached claims.

What is claimed is:

1. A method for separating high boiling point organic compounds from the polymer particles of an aqueous emulsion or suspension polymerization product, comprising:

obtaining an aqueous emulsion or suspension polymerization product, formed from monomers in the presence of water, containing polymer particles, water, and high boiling point organic compounds;

adding an organic solvent stripping aid to said aqueous emulsion or suspension polymerization product, and allowing said organic solvent to be absorbed into the polymer particles of said aqueous emulsion or suspension polymerization product;

contacting said aqueous emulsion or suspension polymerization product containing said organic solvent stripping aid with a gas or vapor at temperature and pressure conditions which cause mass transfer of said high boiling point organic compounds from said aqueous emulsion or suspension polymerization product to said gas or vapor; and separating said gas or vapor containing said transferred high boiling point organic compound from said aqueous emulsion or suspension polymerization product.

2. The method of claim 1, wherein the high boiling point organic compounds comprise one or more unreacted monomers, dimers, low molecular weight oligomers, or by-products, wherein said organic solvent stripping aid is a water immiscible solvent, and wherein the amount of said organic solvent stripping aid is from about 0.5 to about 50 parts by weight per 100 parts by weight of said aqueous polymer.

3. The method of claim 2, wherein said water immiscible solvent has a normal boiling point temperature from about 50° C. to about 120° C.

4. The method of claim 3, wherein said organic solvent stripping aid is an aliphatic compound having from 5 to about 9 carbon atoms, or an aromatic or an alkyl substituted aromatic compound having from 6 to about 9 carbon atoms, or combinations thereof, and wherein said gas or vapor is air, nitrogen, helium, carbon dioxide, or steam, or combinations thereof.

5. The method of claim 4, wherein said separation temperature is from about 10° C. to about 99° C., and said separation pressure is from about 2 to about 14 psia.

6. The method of claim 5, including contacting said gas or vapor in a continuous mode with said mixture of said organic solvent stripping aid and said aqueous emulsion or suspension polymerization product and wherein said gas or vapor flows countercurrent to said mixture.

7. The method of claim 6, wherein said organic solvent stripping aid is heptane, hexane, 2-methyl hexane, cyclohexane, cycloheptane, benzene, toluene, o-xylene, m-xylene, p-xylene, or combinations thereof, wherein the amount of said solvent is from 0.75 to about 30 parts by weight;

wherein said separation temperature is from about 40° C. to about 95° C.; and wherein said separation pressure is from about 5 psia to about atmospheric pressure.

8. The method of claim 7, wherein said organic solvent stripping aid has a normal boiling point temperature of from about 80° C. to about 100° C., and wherein said separation temperature is from about 70° C. to about 90° C. and said separation pressure is from about 5 psia to about 10 psia.

9. A process for separating 4-phenyl cyclohexene from an aqueous carboxylated styrene-butadiene or an aqueous styrene-butadiene emulsion or suspension latex, comprising:

obtaining an aqueous emulsion or suspension carboxylated-styrene-butadiene or styrene-butadiene latex, formed from monomers in the presence of water, containing polymer particles, water, and comprising a 4-phenyl cyclohexene byproduct;

contacting for every 100 parts by weight of said aqueous emulsion or suspension carboxylated-styrene-butadiene or styrene-butadiene latex with from about 0.5 to about 50 parts by weight of a non-polar, water-immiscible organic solvent having a normal boiling point temperature of from about 50° C. and about 120° C.;

contacting said aqueous emulsion or suspension carboxylated-styrene-butadiene or said styrene-butadiene latex and said organic solvent with a gas or vapor at temperature and pressure conditions which cause mass transfer of said 4-phenyl cyclohexene from said aqueous latex to said gas or vapor; and separating said gas or vapor containing said transferred 4-phenyl cyclohexene from said aqueous emulsion or suspension carboxylated-styrene-butadiene or styrene-butadiene latex.

10. The process of claim 9, wherein said organic solvent is an aliphatic compound having from 5 to about 9 carbon atoms, or an aromatic compound having from 6 to about 9 carbon atoms, or combinations thereof, and wherein said gas or vapor is air, nitrogen, helium, carbon dioxide, or steam, or combinations thereof.

11. The process of claim 10, wherein said organic solvent is utilized in an amount from about 0.75 to about 30 parts by weight per 100 parts by weight of said aqueous emulsion or suspension carboxylated-styrene-butadiene or styrene-butadiene latex, and wherein said solvent is heptane, hexane, 2-methyl-hexane, cyclohexane, cycloheptane, benzene, toluene, m-xylene, o-xylene, p-xylene, or a combination thereof.

12. The method of claim 5, wherein said aqueous emulsion or suspension polymerization product is a carboxylated-styrene-butadiene or a styrene-butadiene latex, and wherein said high boiling point organic compound comprises 4-phenyl cyclohexene.

* * * * *